United States Patent [19]

Speicher

[11] 3,738,546
[45] June 12, 1973

[54] METERING DEVICE FOR SECUREMENT TO THE HOPPER OR CONTAINER OF A DISTRIBUTOR OF SEEDS AND OTHER FLUENT MATERIAL

[75] Inventor: Paul L. Speicher, North Manchester, Ind.

[73] Assignee: The Cyclone Seeder Company, Urbana, Ind.

[22] Filed: May 10, 1971

[21] Appl. No.: 141,550

[52] U.S. Cl.................. 222/561, 222/410, 239/687
[51] Int. Cl............................................. B67d 3/00
[58] Field of Search .................. 222/177, 178, 410, 222/561; 239/681, 687, 683

[56] References Cited
UNITED STATES PATENTS

| 3,394,892 | 7/1968 | Speicher | 239/683 |
| 186,214 | 1/1877 | Pearce | 239/687 |
| 2,565,427 | 8/1951 | Herd | 222/410 X |
| 2,882,060 | 4/1959 | Speicher | 239/687 |
| 1,966,192 | 7/1934 | Tiede | 222/410 |

Primary Examiner—Robert B. Reeves
Assistant Examiner—David A. Scherbel
Attorney—Oltsch & Knoblock

[57] ABSTRACT

A device which can be secured to the hopper or container of a seed or other fluent material distributor and which serves to regulate the amount of seed or other material which passes from the container to the spreader or broadcaster of the distributor. The metering device includes a mounting plate which is securable to the bottom wall of the fluent material container and which has a discharge opening formed therein. A shiftable door plate is carried by the mounting plate and can be made to selectively cover a portion of the discharge opening in the mounting plate and thus regulate the effective area of the discharge opening.

1 Claim, 4 Drawing Figures

INVENTOR.
PAUL L. SPEICHER
BY Oltsch & Knoblock
ATTORNEYS

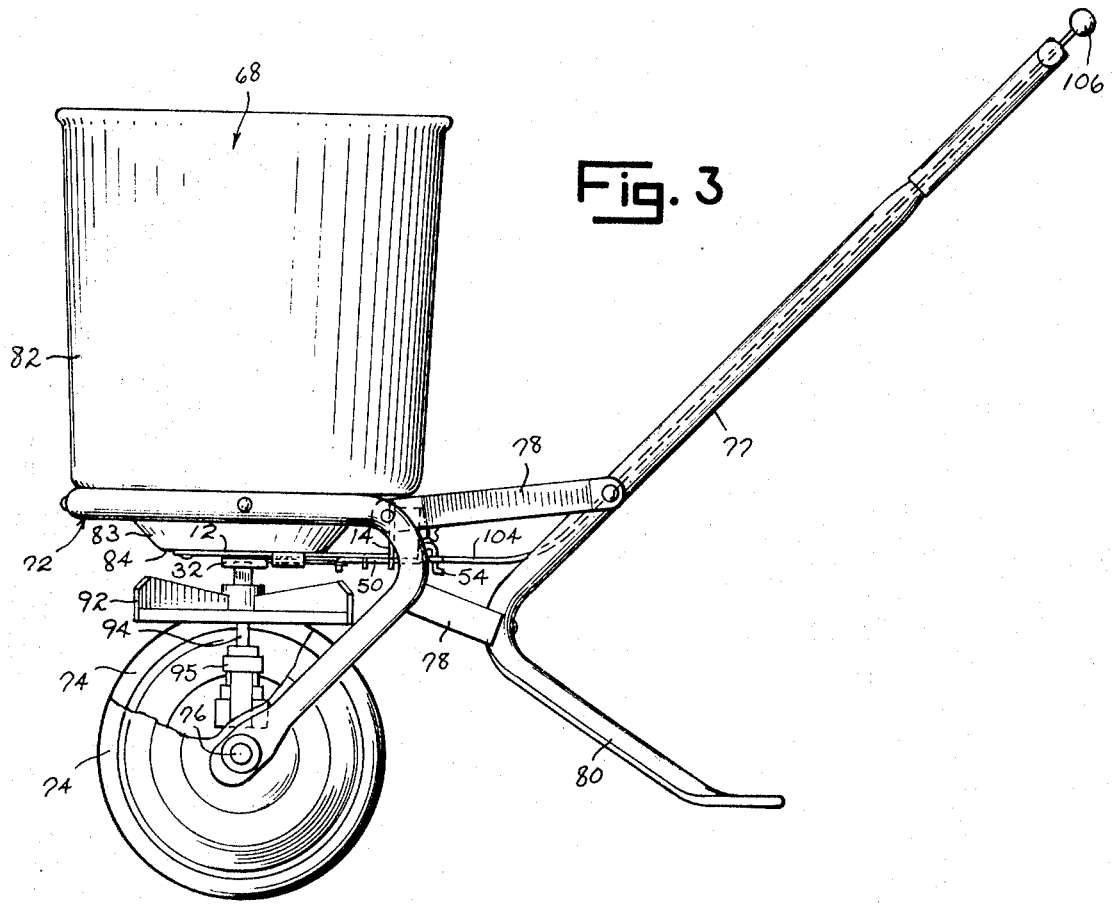
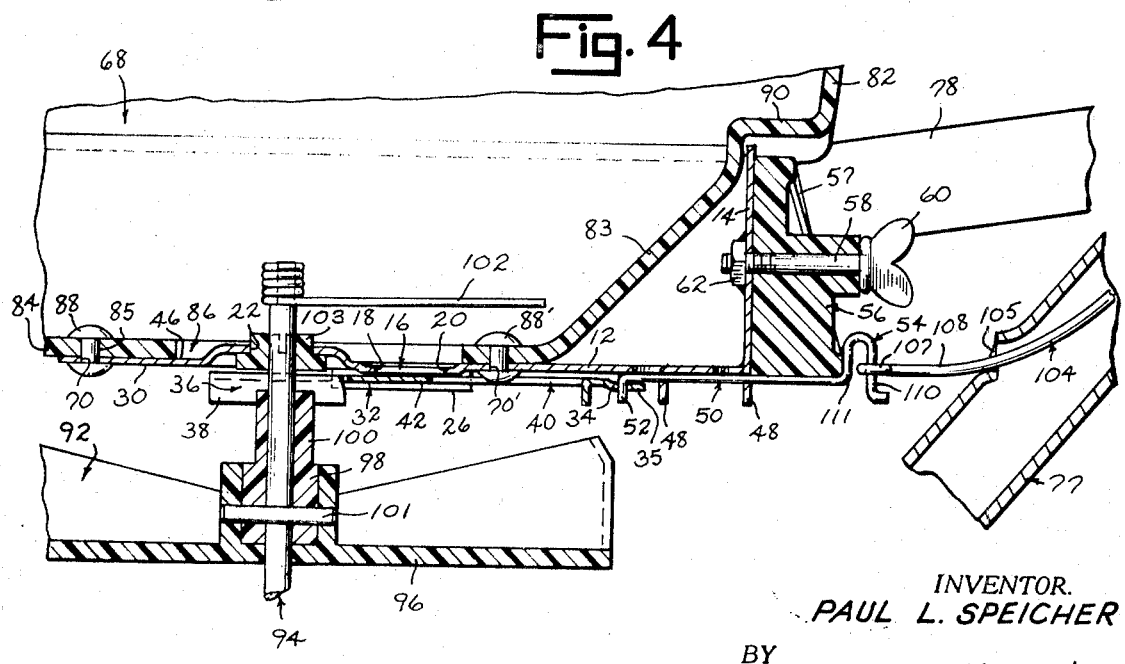

3,738,546

METERING DEVICE FOR SECUREMENT TO THE HOPPER OR CONTAINER OF A DISTRIBUTOR OF SEEDS AND OTHER FLUENT MATERIAL

SUMMARY OF THE INVENTION

This invention relates to a device which can be secured to a container for fluent material, such as seed or other fluent material, and which, in conjunction with a broadcasting or spreader means, will serve to regulate the discharge rate of the material as it passes from the container to the broadcasting or spreader means for distribution. Specifically, this invention has application to a metering device which is of an integral construction and which can be secured as a unit to a hopper of a fluent material distributor.

Broadcast seeders have long utilized metering devices which serve to regulate the discharge rate of the seed from the seed hopper. Examples of such devices can be found in U.S. Pat. Nos. 2,843,387 and 3,175,739. Heretofore, these metering devices have been constructed as an integral part of the seed hopper, thereby increasing the cost of manufacture of the seeder as well as making repair of the seeder more difficult. In this invention, the metering device is of a separately constructed entity which can easily be secured as a unit to the seeder hopper by means of rivets or similar attachment means.

The metering device of this invention includes a mounting plate which has a discharge opening therein and which carries a shiftable door plate. The door plate can be shifted to cover any desired portion of the discharge opening in the mounting plate and thus vary the effective area of the discharge opening. The mounting plate is adapted to be secured to the bottom wall of a hopper or similar container which holds the seed or other fluent material. By designing the metering device as a separate attachable unit, the container for the seed or fluent material can be formed of plastic, metal or other type construction. Additionally, it is contemplated that the metering device of this invention can be removably secured to throw-away containers.

Accordingly, it is an object of this invention to provide a metering device for a seed or other fluent material distributor which is of economical construction and which can be secured as a unit to the fluent material container of the distributor.

Another object of this invention is to provide a metering device which is for use in the distribution of fluent material, which is of a unitary, separate construction and which may be removably secured, if desired, to the container for the material.

Still another object of this invention is to provide a metering device for seed or other fluent material distributors which is of an improved, economical construction.

Other objects of this invention become apparent upon a reading of the invention's description.

BRIEF DESCRIPTION OF THE DRAWINGS

A preferred embodiment of this invention has been chosen for purposes of illustration and description wherein:

FIG. 3 is a side elevational view of a broadcast spreader having the metering device shown in FIGS. 1 and 2 secured thereto.

FIG. 4 is an enlarged fragmentary view of the spreader of FIG. 3 shown with portions sectioned to better illustrate the construction of the metering device of FIGS. 1 and 2.

DESCRIPTION OF THE PREFERRED EMBODIMENT

Figure 1:
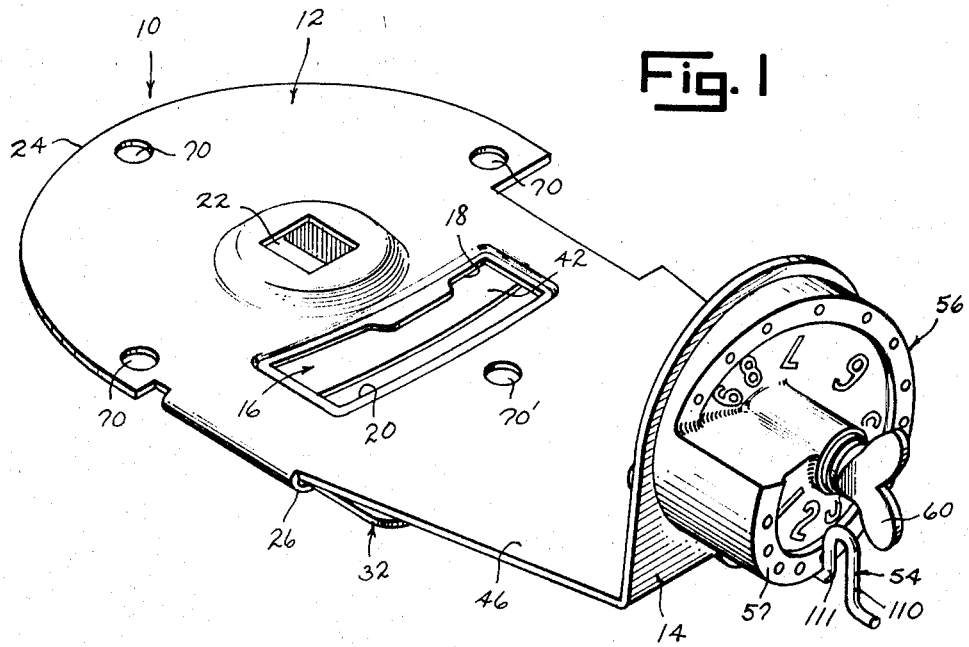
FIG. 1 is a perspective view of the metering device as seen from above.
Figure 2:
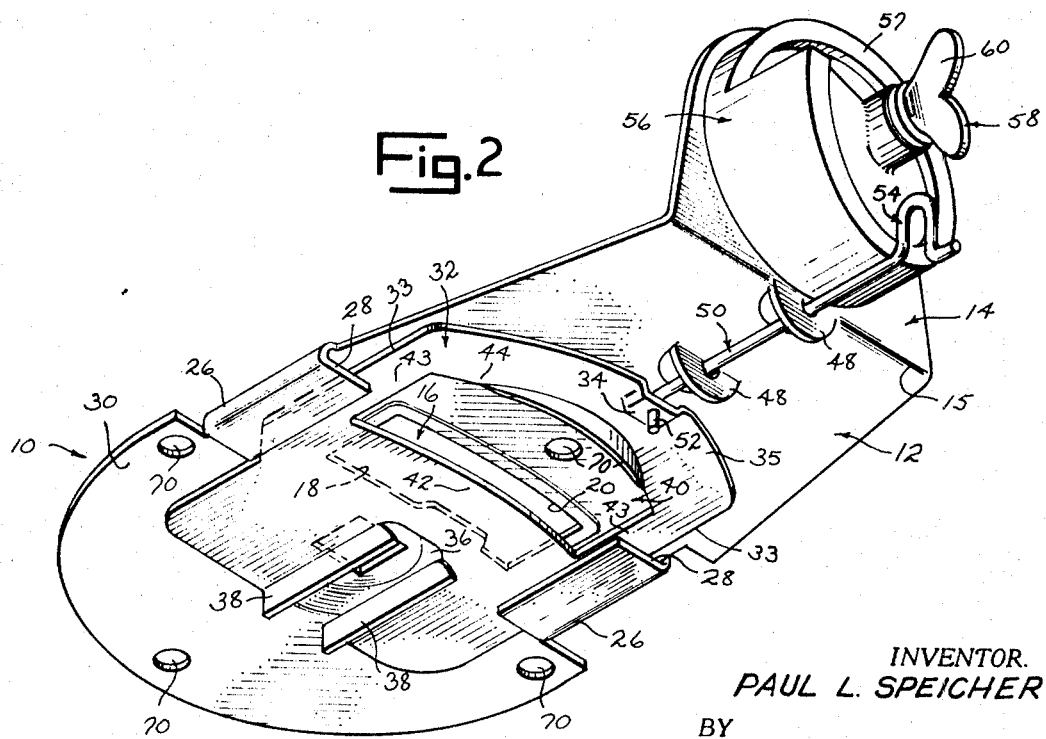
FIG. 2 is a perspective view of the metering device as seen from below.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The metering device illustrated in the accompanying drawings includes a mounting plate 10 having a horizontal wall part 12 and a vertical wall part 14 which is integrally joined to one end edge 15 of wall part 12. An elongated material discharge opening 16 having spaced side edges 18 and 20 is formed in horizontal wall part 12. An opening 22, which is adapted to receive the shaft of a broadcast impeller when the mounting plate is secured to a spreader, is formed in the mounting plate and is located between opening 16 therein and end edge 24 of wall part 12. Oppositely located return bent tabs 26 are formed at the side edges of wall part 12. Each tab 26 includes a lip 28 which preferably parallels and is spaced from lower face 30 of wall part 12.

A sliding door plate 32 confronts lower face 30 of wall part 12 and is held in an adjacent relationship thereto by having its side margins carried between tab lips 28 and face 30 of the wall part. The side edges 33 of door plate 32 preferably fit with sufficient lateral clearance within tabs 26 so that the door plate is able to experience both longitudinal and lateral movement relative to wall part 12. Door plate 32 includes a depression part 34 formed in its one end margin 35 and a slot 36 formed in its opposite end margin. Spaced parallel flanges 38 project downwardly from door plate 32 and define the side edges of slot 36 therein. An opening 40 is formed in door plate 32 between depression 34 and slot 36 therein. Opening 40 is defined by side edge portions 42 and 44 and has a length, as measured across the width of the door plate, which preferably exceeds the length of opening 16 in wall part 12 so that the door plate may be shifted laterally between tabs 26 without the end edge portions 43 of opening 40 covering any substantial portion of discharge opening 16.

Vertical wall part 14 of mounting plate 10 projects above upper face 46 of horizontal wall part 12. One or more guide tabs 48 are formed in wall part 12 and project below lower face 30 thereof. Each guide tab 48 includes an aperture through which a rod 50 is slidably inserted. One end of rod 50 includes a down-bent hook part 52 which projects with clearance through an opening in depression part 34 of the door plate. Rod 50 projects outwardly of the plane of the outer face of wall part 14 and has its opposite end formed into a U-shaped, upwardly projecting hook part 54 which serves as a cam follower. Longitudinal movement of rod 50 within guide tabs 48 causes a corresponding longitudinal movement of door plate 32 relative to mounting plate 10. As door plate 32 is shifted longitudinally relative to wall part 12, edge portion 42 of the door plate opening will be caused to cover and uncover portions of discharge opening 16 in wall part 12 and thus vary the effective area of the discharge opening.

A rotatable gauge member 56 is carried at the outer face of vertical wall part 14. A tightening bolt 58 having a winged-head 60 extends with clearance through a coaxial bore in gauge member 56 and through a registering opening in wall part 14. The threaded end of bolt 58 is turned into a nut 62 which is spot welded or otherwise fixedly secured to the inner face of wall part 14. Gauge member 56 includes a helical cam surface 57 which is concentric to bolt 58. Hook portion 54 of rod 50, in one operative position thereof, abuts cam surface 57 of gauge member 56 so as to cause edge portion 42 of the door plate to cover a selected portion of discharge opening 16 in wall part 12. The extent to which discharge opening 16 is covered by edge portion 42 of the door plate depends upon the rotative position of gauge member 56. The gauge member preferably has indicia printed thereon which permits the user of the metering device, upon loosening of bolt 58, to rotate the gauge member and select a specifically sized discharge opening for the metering device. Once a specifically sized discharge opening has been selected by the user, bolt 58 is tightened. Hook portion 54 of rod 50, in addition to its one operative position in which it abuts cam surface 57 of the gauge member so as to position edge portion 42 thereof over a selected portion of discharge opening 16, has a second operative position in which it is positioned spacedly outwardly from gauge member 56 with end margin 35 of the door plate abutting a guide tab 48. When end margin 35 so abuts a guide tab 48, edge portion 42 of the door plate slightly overlaps edge 20 of discharge opening 16 and thereby closes the discharge opening to prevent flow of particulate material therethrough.

In order to secure the metering device above described to the hopper 68 of the spreader type distributor shown in FIGS. 3 and 4, horizontal wall part 12 of the mounting plate is provided with a plurality of spaced holes 70. Holes 70 are circumferentially spaced about wall part 12 with one such hole 70' being located between discharge opening 16 and nearest tab 48 of wall part 12. The spreader illustrated in FIGS. 3 and 4 is of the broadcast type, having a tubular frame 72 which is supported by a pair of wheels 74 interconnected by a rotatable axle 76. A handle 77 is connected by brace members 78 to frame 72. Handle 77 includes a ground-engaging leg 80 which, in conjunction with wheels 74, serves as a three-point support for frame 72. Hopper 68, which may be constructed of a polyvinyl or other type plastic material, includes side wall 82 and an inset tapered bottom wall 83 having a flattened section 84 which has an opening 86 therein. Hopper 68 sets within frame 72 and is preferably secured thereto by suitable attachment means, such as rivets. Horizontal wall part 12 of the mounting plate has its upper face 46 positioned against bottom wall section 84 of hopper 68, with openings 16 and 22 therein located under opening 86 of the hopper. Rivets 88, or similar attachment means, extend through holes 70 in the mounting plate and registering openings 85 in bottom wall section 84 and serve to attach the metering device to the hopper. Rivet 88', by means of the location of its receiving hole 70', is positioned within opening 40 in door plate 32 in all operative positions of the door plate so as not to interfere with the operation of the metering device. Vertical wall part 14 of mounting plate 10 and gauge member 56 carried thereby preferably extend upwardly and are positioned just under inset portion 90 of hopper side wall 82.

An impeller 92, which serves to the distribute the material in radial fashion as it falls through discharge opening 16 in the metering device, is positioned under the discharge opening and is rotatably carried by a vertical shaft 94. Impeller 92 is preferably of a molded plastic construction consisting of a blade-carrying part 96 and a hub part 98 through which shaft 94 extends. Hub part 98 carries a cam member 100. Impeller 92 is secured to shaft 94 by a pin 101 which is pressed fitted through registering apertures in impeller parts 96 and 98 and shaft 94. The lower end of shaft 94 is connected to a gear which forms a part of a transmission 95 between the shaft and spreader axle 76. As the spreader is pushed by handle 77, wheels 74 cause the rotation of axle 76 which transmission 95 serving to impart rotary motion to shaft 94 and impeller 92. The upper end portion of shaft 94 extends through slot 36 in door plate 32 and opening 22 in wall part 12 of the mounting plate and projects into the interior of hopper 68 where an agitator 102 may be secured thereto. A bushing 103 is pressed into opening 22 in wall part 12 and journals the upper end portion of shaft 94. Cam member 100 of impeller 92 is spaced below lower face 30 of wall part 12 and is positioned between flanges 38 of the door plate. As impeller 92 is rotated, cam member 100 contacts in alternate fashion flanges 38 and causes oscillatory movement of the door plate between tabs 26 of wall part 12. An actuator rod 104 having a knob 106 at the upper end thereof extends downwardly through handle 77 of the seeder. The lower end portion 108 of rod 104 projects outwardly through an opening 105 in the handle at the approximate level of hook portion 54 of rod 50. The lower end of actuator rod 104 is formed into an eyelet 107 which receives outer leg 110 of hook portion 54.

When knob 106 of rod 104 is pushed inwardly toward handle 77, inner leg 111 of hook portion 54 engages cam surface 57 of gauge member 56 to position edge portion 42 of the door plate over a selected portion of discharge opening 16 in mounting plate 10. To close discharge opening 16 in the mounting plate, knob 106 is pulled outwardly away from the handle 76, thus causing edge portion 42 of the door plate to slightly overlap edge 20 of the discharge opening.

Mounting plate 10 and door plate 32 may be formed from sheet metal in a simple stamping and forming operation. Additionally, plates 10 and 32 may be formed of a molded plastic; in which case bushing 103 can be molded as a part of plate 10. Mounting plate 10 can be bolted as well as riveted to hopper 68 and, in some constructions of the container for fluent material can be fitted lengthwise into slotted retaining means formed in the bottom wall of the container. Also, in some applications of this invention the horizontal wall part 12 of the mounting plate can be bonded with a suitable adhesive to the marginal portions of the side or bottom wall of the container for fluent material. In come constructions of this invention the aperture in vertical wall part 14 of the mounting plate through which bolt 58 is inserted can be of a thread-gripping configuration, such as a Tinnerman nut construction, for threaded engagement with the bolt. It is further contemplated that bolt 58 could be eliminated and a suitable detent and groove engagement means incorporated between wall part 14 and dial knob or gauge member 56 permitting incremental gauge-setting rotation of the gauge member. One such detent and groove means could constitute saw teeth formed on the back side of gauge member 56 which match with saw teeth formed on the outer face of wall part 14 and which are held in releasable locked engagement therewith by a tension device.

It is to be understood that the invention is not to be limited to the details herein given but may be modified within the scope of the appended claims.

What I claim is:

1. A metering device for use in conjunction with means usable for distributing seed, plant and other fluent material and which including a container for said material having a bottom wall with an opening therein, comprising a mounting plate having a horizontal wall part and a vertical wall part joined to one edge of said horizontal wall part, said horizontal wall part having a material discharge opening therein and including means used in securing said mounting plate to said container with said discharge opening being positioned under said container opening to permit the material in said container to pass through said discharge opening, said discharge opening being defined by spaced first and second edges, a door plate, said door plate including spaced first and second edge portions defining an opening in said door plate, said horizontal wall part including means supporting said door plate in an adjacent confronting relationship to the lower face of said horizontal wall part, said supporting means permitting said door plate to shiftably move relative to said mounting plate and cover portions of said discharge opening to vary the effective discharge area of said discharge opening, the first edge portion of said door plate opening located in all operative positions of said door plate between the first edge of said discharge opening and said vertical wall part, the second edge portion of said door plate opening defining in conjunction with said first edge of said discharge opening the effective discharge area of said discharge opening and having one limit position adjacent the second edge of said discharge opening wherein said discharge opening is completely open and another limit position adjacent the first edge of said discharge opening wherein the discharge opening is closed, said door plate supporting means permitting oscillatory movement of said door plate relative to said mounting plate in a direction generally transverse to said shiftable movement of said door plate in varying the effective discharge area of the discharge opening, a shiftable member having an axis carried by said mounting plate, one end of said member connected to said door plate, the other end of said member defining a cam follower located adjacent said vertical wall part, gauging means including a cam surface carried by said vertical wall part, said gauging means being located between said cam follower and said door plate, said cam follower comprising a U-shaped portion off-set from the axis of said member and having inner and outer legs, the inner leg of said cam follower abutting said cam surface to position the second edge portion of said door plate a selected distance from said first edge of said discharge opening, said gauging means being movable to vary the location of said cam follower relative to said mounting plate and to position said door plate second edge portion said selected distance from said discharge opening first edge, and actuator rod means connected to the outer leg of said cam follower for shifting the second edge portion of said door plate between its said limit positions.

2. A metering device for use in conjunction with means usable for distributing seed, plant and other fluent material and which includes a container for said material having a bottom wall with an opening therein, comprising a mounting plate having a horizontal wall part and a vertical wall part joined to one edge of said horizontal wall part, said horizontal wall part having a material discharge opening therein and including means used in securing said mounting plate to said container with said discharge opening being positioned under said container opening to permit the material in said container to pass through said discharge opening, said discharge opening being defined by spaced first and second edges, a door plate, said door plate including spaced first and second edge portions defining an opening in said door plate, said horizontal wall part including means supporting said door plate in an adjacent confronting relationship to the lower face of said horizontal wall part, said supporting means permitting said door plate to shiftably move relative to said mounting plate and cover portions of said discharge opening to vary the effective discharge area of said discharge opening, one of said first and second edge portions of said door plate opening defining in conjunction with said first edge of said discharge opening the effective discharge area of said discharge opening and having one limit position adjacent the second edge of said discharge opening wherein said discharge opening is completely open and another limit position adjacent the first edge of said discharge opening wherein the discharge opening is closed, a shiftable member having an axis carried by said mounting plate, one end of said member connected to said door plate, the other end of said member defining a cam follower located adjacent said vertical wall part, gauging means including a cam surface carried by said vertical wall part, said gauging means being located between said cam follower and said door plate, said cam follower comprising a U-shaped portion off-set from the axis of said member and having inner and outer legs, the inner leg of said cam follower abutting said cam surface to position said one edge portion of said door plate a selected distance from said first edge of said discharge opening, said gauging means being movable to vary the location of said cam follower relative to said mounting plate and to position said door plate one edge portion said selected distance from said discharge opening first edge, and actuator rod means connected to the outer leg of said cam follower for shifting said one edge portion of said door plate between its said limit positions.

* * * * *